United States Patent [19]

Sharkey et al.

[11] 4,018,162

[45] Apr. 19, 1977

[54] CONTINUOUS DUPLICATING SHEETS

[76] Inventors: Melvin Sharkey, 1614 Hereford Road, Hewlett, Long Island, N.Y. 11557; Douglas A. Newman, Soundside Lane, Glen Cove, N.Y. 11542

[22] Filed: Aug. 10, 1973

[21] Appl. No.: 387,532

[52] U.S. Cl. ........................... 101/473; 101/401.1; 156/90; 427/152; 427/179; 427/261; 427/300; 428/514

[51] Int. Cl.[2] .................... B41M 5/02; B32B 33/00

[58] Field of Search ............... 101/468, 473, 401.1, 101/470

[56] References Cited

UNITED STATES PATENTS

| | | | |
|---|---|---|---|
| 2,271,758 | 2/1942 | Champion | 101/473 X |
| 3,216,350 | 11/1965 | Sharkey | 101/473 X |
| 3,287,153 | 11/1966 | Schwarz et al. | 101/468 |
| 3,418,148 | 12/1968 | Barz | 117/36.1 |
| 3,427,971 | 2/1969 | Steber et al. | 101/473 |
| 3,484,271 | 12/1969 | Kaliski et al. | 117/154 X |
| 3,490,368 | 1/1970 | Bean | 101/401.1 X |
| 3,607,527 | 9/1971 | Morley | 101/470 |

FOREIGN PATENTS OR APPLICATIONS

| | | | |
|---|---|---|---|
| 959,315 | 5/1964 | United Kingdom | 117/36.1 |
| 989,622 | 4/1965 | United Kingdom | 117/36.1 |

OTHER PUBLICATIONS

IBM Technical Disclosure Bulletin, (Elt et al.), vol. 13, No. 9, Feb. 1971, p. 2476.

*Primary Examiner*—Clyde I. Coughenour
*Attorney, Agent, or Firm*—Thomas L. Tully

[57] ABSTRACT

A dry duplicating method comprising the steps of pressure-imaging a continuous master web with images capable of exuding liquid ink under the effects of contact pressure such as roller pressure and collecting the imaged master web on a roll for duplicating use. The master web is such that at least one surface is receptive to the pressure-applied images but neither surface is capable of absorbing the liquid ink to any substantial degree. The imaged web is duplicated by continuously bringing it into surface contact with an ink-absorbent copy web while pressure is applied to exude the liquid ink from the master images onto the copy web to form a duplicate copy, after which the web is continuously rolled up on another roller for reuse.

9 Claims, 3 Drawing Figures

CONTINUOUS DUPLICATING SHEETS

Figure 1:
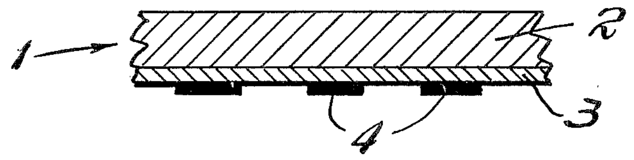

Several methods have been proposed in the past for the continuous duplication of imaged master webs. The best known and most widely used method is the spirit hectograph method in which the master web is imaged with undissolved hectograph dyestuff or reactive color-former and is collected on a take-up roll for subsequent duplication in a spirit duplicating process in which the imaged master is pressed against a continuous copy web which has been moistened with a liquid alcoholic solvent for the dyestuff or color-former.

In order to avoid the use of combustible volatile solvents, it was proposed to use such imaged masters in association with copy sheets coated with non-volatile dye solvents such as cetyl alcohol, heat being used to liquefy the cetyl alcohol so that is could dissolve the dyestuff or color-former from the master images during contact. While this method has met with commercial success, it has the disadvantage of requiring the use of coated copy paper, which is expensive, and also the use of heat, which involves some expense and some discomfort to the operator.

Pressure-copying processes have been proposed for the duplication of individual paper master sheets whereby a solid or fluid portion of the master images is transferred to a succession of uncoated copy papers under the effect of pressure to produce duplicates of the imaged master sheet. While such processes are used with much success to produce a limited number of copies from an imaged master sheet, they were found to be unsatisfactory when converted to continuous processes for duplicating continuous imaged paper master webs which must be collected on a take-up roll. When such continuous master webs are imaged and collected on a take-up roll, the images are in contact with the undersurface of the paper master web, and the convolutions of the master web exert a substantial pressure against each other and against the images confined therebetween. If the images are of the type which transfer solid portions thereof during duplication, then such images transfer solid portions to the underside of the master web under the pressure exerted on the take-up roll. If used for duplicating purposes, the portions of the images remaining on the surface of the master are not capable of producing many, if any, satisfactory copies. Furthermore the portions of the master images which have transferred to the underside of the master web contaminate the rollers which transport the master web.

If the images on the continuous imaged master web on the take-up roll are of the type which exude liquid ink to the copy web during duplication, then such liquid ink is drained from such images into the underside of the paper master web so that the master images are not capable of producing many, if any, suitable copies when the master web is unrolled after a time and pressed against a copy web.

The present invention is concerned with continuous processes of the latter type in which the images on the paper master web are of the type which exude liquid ink to a copy web under the effect of applied pressure, and it is the principal object of the present invention to provide a continuous paper master web which can be provided with such images and rolled up during use without drainage and loss of the liquid ink into the master sheet.

It is another object of this invention to provide a continuous process for the duplication of imaged paper master webs which does not require the use of heat, solvent or coated copy sheets.

It is yet another object of this invention to provide a continuous process for the duplication of imaged paper master webs which are stable against loss of imaging strength and which can be rolled up and stored for periodic duplication as required.

Figure 2:
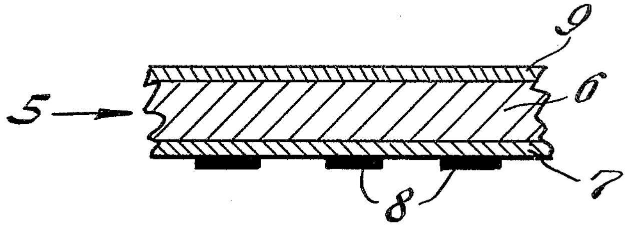
Figure 3:
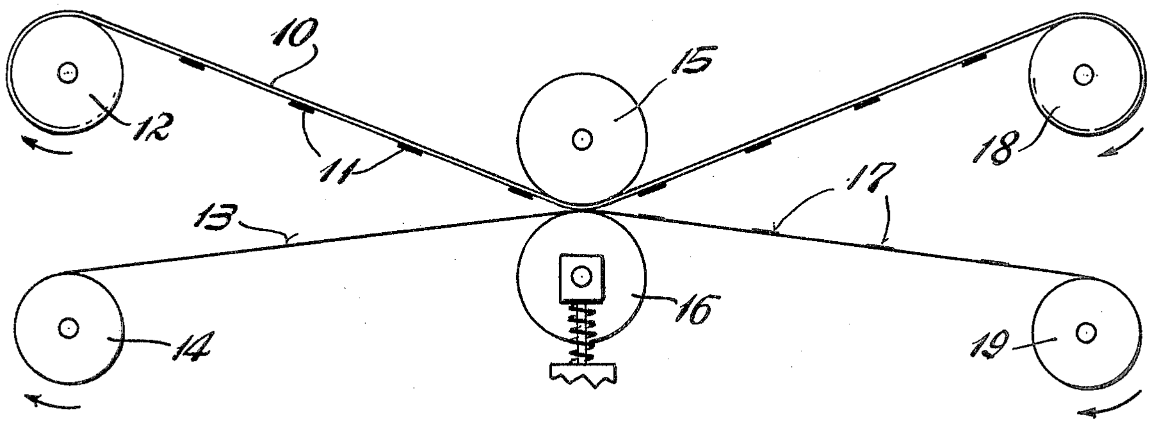

These and other objects and advantages of the present invention will be apparent to those skilled in the art in the light of the present disclosure including the drawings, in which:

FIG. 1 is a diagrammatic cross-section, to an enlarged scale, of a section of an imaged continuous master web suitable for use according to the present invention, FIG. 2 is a diagrammatic cross-section, to an enlarged scale, of a section of an imaged continuous master web suitable for use according to another embodiment of the present invention, and FIG. 3 is a section side view of a duplicating apparatus containing an imaged continuous master web and a continuous copy web being imaged therewith.

The present invention involves the discovery that it is possible to use continuous rolled paper master webs carrying pressure-sensitive, ink-exuding images in a continuous duplicating process provided that such paper master webs are pretreated to have an image-receptive oil-barrier layer on the working surface of the paper web and a treatment to prevent the paper fibers at the opposite surface of the paper web from absorbing oil from master images in contact with that surface when the master is rolled up.

The paper master webs of the present invention all have a continuous, image-receptive oil-barrier layer or coating on the working surface. Referring to the drawings, FIG. 1 shows a section of a master paper web 1 comprising a treated paper 2 coated with an image-receptive oil-barrier layer 3 carrying ink-exuding images 4.

FIG. 2 shows a section of another master paper web 5 comprising an untreated master paper 6 coated on the working surface with an image-receptive oil-barrier layer 7 carrying ink-exuding images 8 and coated on the back surface with an oil-barrier layer 9.

The continuous master webs are duplicated in the manner illustrated by FIG. 3 whereby a continuous master web 10 carrying ink-exuding images 11 is expended from supply roll 12 into pressure contact with the continuous copy paper web 13 which is expended from supply roll 14. Pressure contact occurs in the nip of roller 15 and pressure roller 16 to exude some of the liquid ink from images 11 onto the surface of the copy web 13 to form duplicate copy images 17 thereon. The master web is then collected on take-up roll 18 for reuse and the imaged copy web is collected on take-up roll 19.

The duplicating process is repeated as often as necessary, using the same imaged master web to make up to fifty or more duplicate copies on new lengths of copy paper web. The copies are mirror-reverse duplicates of the master, which is immaterial in the case of garment patterns, designs and the like, but which necessitates the use of a mirror-reverse-imaged master web in many cases such as where the subject matter comprises words.

The paper stock used for the master paper web of the present invention may be conventional master paper stock or other paper stock such as 50 to 60 pound bleached Kraft paper. According to the embodiments of both FIGS. 1 and 2, an image-receptive oil-barrier layer 3 or 7 is applied to form the working surface of the master web. This layer comprises a continuous synthetic thermoplastic resin which is inert with respect to the liquid ink present in the duplicating images 4 or 8. Thus, the liquid vehicle of the ink is not a plasticizer or solvent for the oil-barrier layer 3 or 7.

Preferably the oil-barrier layer is applied as an emulsion or dispersion so as to be retained well up on the surface of the master paper web to insure complete coverage of all of the paper fibers. However resin solutions may also be used provided that viscosity and drying time are controlled to insure low penetration and fast drying. Preferred oil-barrier compositions are the aqueous emulsions of vinyl resins such as polyvinylidene chloride and acrylic resins such as ethyl acrylate polymers and copolymers. Such emulsions are preferably applied in two passes and are dried to form a continuous oil-barrier layer having good receptive and retentive properties for pressure-applied images 4 and 8. The barrier layer may be heat-fused.

The oil-barrier layer 3 of FIG. 1 or oil-barrier layer 7 of FIG. 2 may include an amount of inert filler, such as silica, in order to improve the "tooth" or retentivity of the layer for the master images 4 and 8 respectively. The filler must have low absorbency powers for the liquid oil ink vehicle and must not interfere with the continuity of the barrier layer. If desired, the oil-barrier layer 3 or 7 may be applied as two coatings, the base coating being free or filler and the top coating containing a substantial amount of filler and having excellent tooth for the master image.

The dry weight of the applied barrier layers 3 and 7 is not critical provided that the barrier layer is continuous and impervious to oil, particularly in areas where the oil-containing master images have been pressure-imaged thereon. In general, barrier coating weights between about 5 and 18 pounds per ream, 3000 square feet, have been found satisfactory, the preferred range being from 9 to 14 pounds per ream.

According to the embodiment of FIG. 1, the master paper web 2 is one which has been pretreated by impregnation with an oil-repellent composition such as a water-soluble long chain fluorochemical composition which cures upon drying to form a water-insoluble chromium complex of the fluorochemical. Suitable compositions are the grease- and oil-repellent paper sizes commercially available from 3M Company under the trademark Scotchban FC-805 and FC-807. Such treatment does not seal the paper or destroy its air porosity. However it does seal each paper fiber, preventing the normally oil-absorbent fibers from absorbing oil which comes in contact with the treated paper.

The use of the above-mentioned oil-repellent impregnations represents a preferred embodiment of the present invention from the standpoint of performance of the imaged master webs. We have found that the impregnated rear surface of the master web not only is resistant to absorbing oils from the master images in contact therewith on the roll but also is resistant to adhesion of the solid master images thereto under the pressure of the convolutions of the web. We have found that if the back surface of the master web is exceptionally smooth, as in the case of plastic films, glazed plastic coatings, and the like, the master images can adhere thereto under the pressure in the roll and can "pick" or transfer thereto, in whole or in part, to destroy or degrade the master information. The impregnated or treated webs, on the other hand, retain their normal porosity and surface roughness and the contact between the surface of the master images and the rear surface of the master web is a discontinuous contact limited to the exposed surfaces of the spaced paper fibers.

According to the embodiment of FIG. 2 of the drawings, a second continuous oil-barrier layer 9 is applied to the rear surface of the paper web in lieu of impregnating the paper web with oil-repellent composition. The layer 9 may be the same as layer 7 in that it must cover and seal all of the paper fibers at the surface and it must be an oil-barrier layer which is inert with respect to the liquid ink present in images 8 since such images contact the rear surface of the master when the master is rolled up. Thus, the preferred compositions for layer 7 are the emulsions or dispersions of synthetic thermoplastic resins such as polyvinylidene chloride, acrylic resins, synthetic rubbers, silicone elastomers, and the like, which are heat-fused sufficiently to form a barrier layer which is continuous but which preferably retains some degree of surface roughness so as to resist "picking" of the master images when the master web is unwound.

The imaging compositions used to form images 4 and 8 on the master sheet web preferably are pressure-sensitive transfer compositions present on carbon papers or ribbons which are transferred to the master by typing or writing pressure. Such compositions comprise a microporous network of wax and/or resinous solid binder material containing within the pores thereof a mechanical dispersion of an incompatible liquid ink comprising a non-volatile liquid oily vehicle which is incompatible with the solid binder material and has a small amount of coloring matter such as dye dissolved therein. Such compositions are frangible or mass-transferable, including the solid binder material, under the effects of localized imaging pressure, such as caused by a type bar or a ball-point pen, but function by exuding the liquid ink from the solid binder material when subjected to non-localized overall pressure as imparted by pressure rollers. Suitable transfer elements and compositions based upon resinous binder materials are illustrated by U.S. Pat. Nos. 3,458,339 and 3,595,683, the teachings of which are incorporated herein by reference. Suitable transfer elements and compositions based upon wax binder materials may be produced by conventional hot-melt techniques using oil-resistant waxes such as carnauba and montan wax together with incompatible oily ink vehicles containing dissolved dyestuff, the wax cooling to a microporous structure containing the ink in mechanical dispersion within the pores thereof.

The transfer compositions comprise a binder such as a vinyl resin or one or more waxes and may contain some inert filler to increase the frangibility of the layer. Also the transfer layer must be present on an oil-resistant release surface such as a plastic film or a coated or treated paper and may be provided with a supercoating, such as a tacky wax, to assist the pressure-transfer properties of the layer. Such transfer compositions contain an oil which is incompatible with the resin or wax binder and which is incompatible with the oil-barrier layer present on the working surface of the master web and incompatible with the oil-barrier layer or treatment present on the rear surface of the master web.

The incompatible oil functions as the ink vehicle and has dissolved therein on reacted therewith a small amount of coloring matter, preferably a dyestuff such as methyl violet base. Among the suitable incompatible oils, i.e. those which are neither soluble in the resin and/or wax binder or in the oil-barrier layer or treatment, nor solvents or plasticizers therefor, are the vegetable oils, animal oils, non-volatile glycol esters and fatty acid esters, fatty acids and alcohols, and the like, and mixtures thereof. The oil vehicle must be liquid but may contain oleaginous materials which are normally semi-solid, per se,. but which are liquefied by their use in mixtures with liquid oils which are solvents therefor or miscible therewith. The selection of the particular oils will depend upon the solubility properties of the coloring matter used and the identity of the binder material and oil-barrier layers and/or treatment, as will be apparent to those skilled in the art.

The following example is given as illustrative of a composition and transfer element useful in carrying out the present invention, and should not be considered as limitative.

| Ingredients | Parts by Weight |
|---|---|
| Lanolin | 6.3 |
| Blown rapeseed oil | 2.5 |
| Oleic acid | 1.0 |
| Victoria blue base | 0.4 |
| Methyl violet base | 1.6 |
| Tergitol | 0.5 |
| Clay | 10.2 |
| Vinyl chloride-vinyl acetate copolymer (VYHH) | 2.0 |
| Toluol | 15.5 |
| Methyl ethyl ketone | 20.0 |

The resin is dissolved in the toluol and methyl ethyl ketone solvents and the other ingredients are added to the solution and the mixture is ground in a ball mill to a coatable consistency.

The ground mixture is coated onto a suitable foundation web and dried by evaporation of the solvents to leave a dry coating having a weight of about 20 pounds per ream (3000 sq.ft.) and a thickness of about 10 points (0.001 inch).

Thereafter the dry resin coating preferably is supercoated with an adhesive wax composition which assists the pressure-transferability of the resin coating. The following supercoating composition is suitable:

| Ingredients | Parts by Weight |
|---|---|
| Mineral oil | 26 |
| Beeswax | 8 |
| Polybutene resin (Indopol H-300) | 8 |
| Carnauba wax | 58 |
| | 100 |

The wax composition is reduced to a hot-melt, coated over the resin layer to a thickness of about 1 point (0.0001 inch) and permitted to cool to form a pressure-sensitive transfer element.

The foundation web must be one which does not absorb the oily ink from the resin layer. A must suitable foundation web is 50 to 60 pound bleached Kraft paper which has been impregnated with an oil-barrier composition such as the fluorochemical compositions discussed hereinbefore in connection with the oil-resistant master web. In fact, the same treated paper may be used as both the master web and as the transfer web foundation provided that the master web is given the additional image-receptive resinous barrier layer on the working surface.

The solvent-applied resin layers and the hot-melt-applied wax layers of the present invention are similar in both structure and performance. In each case the binder material, resin or wax, is present as a microporous skeletal structure containing within the pores thereof a mechanical dispersion of the liquid ink comprising oil and dye. In each case a substantial amount of solid filler or pigment may be present to render the composition more brittle and frangible under the effects of localized imaging pressure, and an adhesive wax supercoat preferably is present to assist frangibility and bonding to the master web.

Both types of transfer compositions function in basically the same manner in transferring substantially completely to the master web in image form under the effects of localized imaging pressure and in remaining bonded to the master web but exuding liquid ink from the pores of the images to the copy web under the effects of overall pressure applied in the manner illustrated by FIG. 3 of the drawings. Preferably pressure roller 16 is adjustable so that various pressures can be applied in order to produce the desired length of run and desired density of copy depending upon the particular transfer composition, master web and copy web employed.

The master web of the present invention may be produced by treating a suitable paper web, such as 50 to 60 pound Kraft paper, with two barrier layers 7 and 9, as shown in FIG. 2, or with a fiber-sealing impregnation and a single barrier layer 3, as shown in FIG. 1. A suitable barrier layer composition is an aqueous emulsion of polyvinylidene chloride resin. Such emulsion preferably is applied in two passes of the web, 7 pounds of emulsion being applied per ream (3000 sq.ft.) in each pass and being air-dried to form the barrier layer. The combined coating may be heat-fused at a temperature above the melting point of the polyvinylidene chloride resin particles but this is not essential.

According to the embodiment of FIG. 2, the barrier layers are applied to both surfaces of the untreated paper web. According to the embodiment of FIG. 1, the paper web is first treated with an olephobic paper sizing composition which seals the paper fibers and thus masks their normal oil-absorbency. Among the preferred materials are non-film-forming, olephobic, hydrophobic chromium coordination complexes of saturated perfluoromonocarboxylic acids, having from 5 to 9 carbon atoms in the molecule, commmercially-available from 3M Company under the trademark Scotch Gard. Other suitable paper sizes are available from 3M Company under the trademark Scotchban and these form chromium complexes of long chain fluorochemicals having a polar head which can interact with the cellulose paper fibers and a non-polar fluorocarbon tail which is both olephobic and hydrophobic.

These fluorochemical compositions are water-soluble and alchol-soluble until applied and heated to form the chromium complex compound. The compositions are preferably applied to the paper web by impregnating the paper web with an isopropyl alcohol solution of the composition and heating the impregnated web to evaporate the alcohol and deposit the insolubilized chromium complex throughout the paper web in an amount ranging from about 0.1% by weight up to about 1% by weight based upon the weight of the paper. The preferred range is from 0.25 to 0.75% by weight. After drying, the paper web is then coated on one surface with the oil-barrier layer composition to form a barrier layer 3 on the working surface of the master web 2 as shown in FIG. 1.

The copies produced in the manner illustrated by FIG. 3 of the drawings and discussed hereinbefore carry stable, smudge-resistant duplicate images 17 which are absorbed into the surface of the paper copy web 13. Since the images are free of solid undissolved dyes and solid binder materials, such as wax, they cannot be smudged or smeared during handling and they will not transfer to or stain the back side of the copy web when the web is collected on take-up roll 19. Furthermore such images 17 will not stain fabrics or cutting devices with which they may come into contact in the case of imaged pattern webs used in the pattern-making field as guides for the cutting of fabrics.

Variations and modifications may be made within the scope of the claims and portions of the improvements may be used without others.

We claim:

1. A pressure-duplicating master sheet comprising a paper foundation which normally is absorbent of liquid oils, an oil-barrier layer of synthetic thermoplastic resin on the working surface of said paper foundation, an image applied to said oil-barrier layer as a composition comprising a pressure-non-transferable microporous network of solid binder material containing within the pores thereof a pressure-exudable ink comprising coloring matter and a liquid oil vehicle which is inert with respect to the resin of said barrier layer, the opposite surface of the paper foundation being treated so as to be non-absorptive of said oil and inert with respect thereto, said image containing a sufficient amount of said pressure-exudable ink to produce a relatively large number of duplicate copies thereof under the effects of pressure.

2. A master sheet according to claim 1 in which the treatment of the opposite surface of the paper foundation comprises an oil-barrier layer of synthetic thermoplastic resin.

3. A master sheet according to claim 1 in which the treatment of the opposite surface of the paper foundation comprises an impregnation of the paper fibers with an inert oil-resistant composition.

4. A master sheet according to claim 3 in which the oil-resistant composition comprises a chromium complex of a long chain fluorochemical compound.

5. A master sheet according to claim 1 which comprises a long web of said paper foundation carrying a multiplicity of said images along its length, said web being rolled up whereby the exposed surfaces of the images present on said working surface of the foundation are in contact with said opposite surface of the foundation.

6. A master sheet according to claim 1 in which said oil-barrier layer comprises polyvinylidene chloride.

7. A master sheet according to claim 1 in which the solid binder material of the image comprises a resinous material.

8. A master sheet according to claim 1 in which the solid binder material of the image comprises wax.

9. A master sheet according to claim 1 in which said image is bonded to said oil-barrier layer by means of an adhesive material having an affinity for said oil-barrier layer.

* * * * *

UNITED STATES PATENT AND TRADEMARK OFFICE

CERTIFICATE OF CORRECTION

PATENT NO. : 4,018,162

DATED : April 19, 1977

INVENTOR(S) : Melvin Sharkey et al

It is certified that error appears in the above-identified patent and that said Letters Patent are hereby corrected as shown below:

Col. 3, line 34, "or" should be --of--;
Col. 3, line 36, put quotes around the word "tooth";
Col. 5, line 5, "on" should be --or--;
Col. 5, line 15, delete period (.) after --per se,--;
Col. 5, line 66, "must" should be --most--;
Col. 6, line 49, "olephobic" should be --oleophobic--;
Col. 6, line 52, "olephobic" should be --oleophobic--;
Col. 6, line 62, "olephobic" should be --oleophobic--.

Signed and Sealed this

*Twentieth* Day of *September 1977*

[SEAL]

*Attest:*

RUTH C. MASON
*Attesting Officer*

LUTRELLE F. PARKER
*Acting Commissioner of Patents and Trademarks*